Patented Nov. 9, 1937

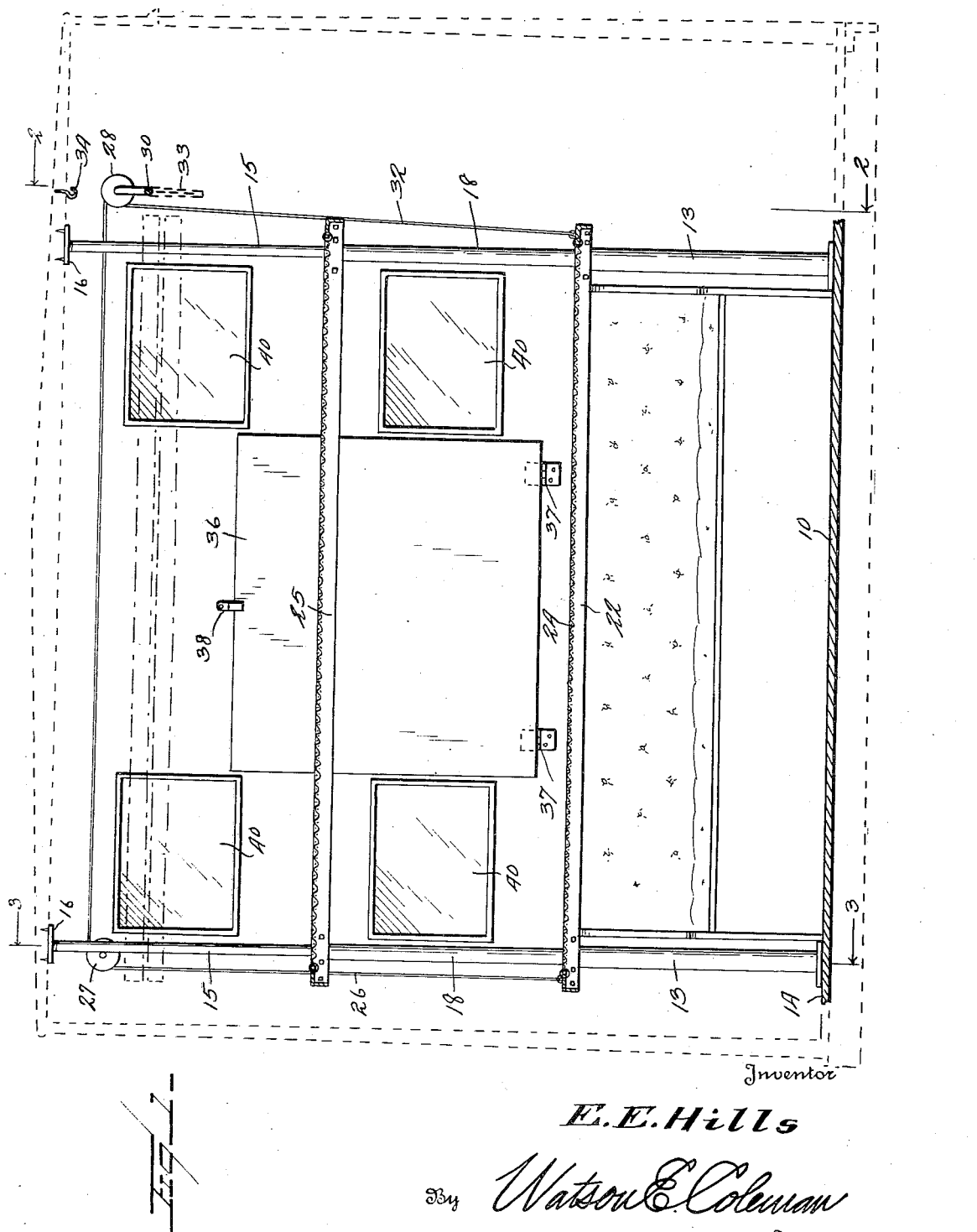

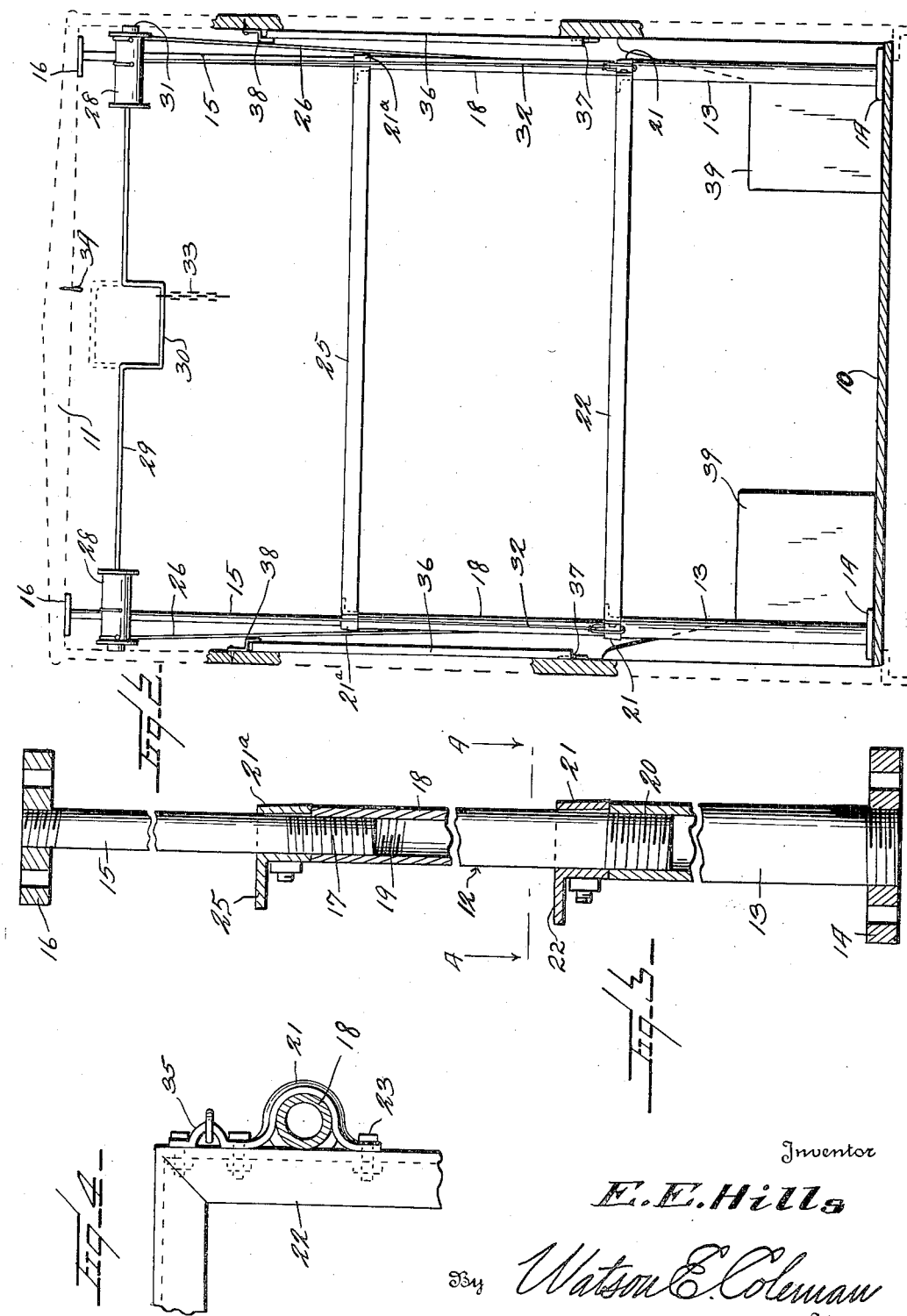

2,098,825

UNITED STATES PATENT OFFICE 2,098,825

BED SUPPORTING STRUCTURE FOR TRAILERS OR AUTOMOBILES

Ernest E. Hills, Oshkosh, Wis., assignor of one-third to Albert J. Ihrke, Oshkosh, Wis.

Application January 4, 1936, Serial No. 57,594
Renewed April 1, 1937

1 Claim. (Cl. 5—9)

This invention relates to automobile trailers or like structures and particularly to means for supporting a plurality of beds within the trailer, and means whereby the beds may be raised into an inoperative position adjacent the roof of the trailer or lowered into operative position.

The general object of the invention is to provide a structure which may be readily applied to automobile trailers or the like, and which includes four posts or equivalent upright members upon which the two beds are mounted for vertical movement, and includes means whereby the upper bed may be freely raised to a point adjacent the top of the automobile and freely lowered to an operating position but is stopped from lowering beyond this operative position, and whereby the lowermost bed may be lowered to an operative position or raised to the upper portion of the trailer, and as it is raised lifts the bed above into its inoperative position.

A further object is to provide means whereby these posts may be made in sections and may be adjustable to suit trailers having different heights.

Other objects will appear in the course of the following description.

My invention is illustrated in the accompanying drawings wherein:—

Figure 1 is a side elevation of my bed construction, the outline of the trailer being shown in dotted lines and both beds being lowered;

Figure 2 is an end elevation of the structure shown in Figure 1, the outline of the trailer being in dotted lines;

Figure 3 is a sectional view of one of the posts and a portion of the bed supporting frames;

Figure 4 is a section on the line 4—4 of Figure 3.

Referring to these drawings, 10 designates the floor of the trailer and 11 the roof thereof, the roof being shown in dotted lines. Disposed adjacent the four corners of the trailer are the posts or uprights which are designated generally 12. Each post consists of three sections. The section 13 is a base section. This section is tubular and screw threaded at its lower end for engagement with a base plate 14. This base plate is perforated for the passage of screws, bolts or other means whereby the base plate may be attached to the floor of the automobile. The uppermost section is designated 15. This has screw threaded engagement with the plate 16 which in turn bears against the roof 11 of the automobile and is apertured for the passage of bolts, screws or other means whereby the plate 16 may be held in place. The lower end of the section 15 is screw threaded at 17. An intermediate section 18 is tubular and is screw threaded at its upper end at 19 for engagement with the screw threaded end of the section 15. The lower end of the section 18 is screw threaded at 20 for engagement with the section 13. These screw threads are in reverse directions so that as this section 18 is rotated in one direction, the sections 13 and 15 will be forced apart, and when it is rotated in the other direction, they will be drawn towards each other. Thus the various sections may be telescoped into each other, then inserted within the trailer and then the section 18 rotated to force the sections 13 and 15, respectively, downward and upward so that the plates 14 and 16 will bear against the floor and roof of the automobile, respectively. Thus the post may be adjusted to fit within any trailer.

Supported upon the section 18 and in use resting upon the upper end of the section 13 is a semi-circular band or clip designated 21 and illustrated in Figure 4, this band or clip being held to the bed supporting frame 22 by means of the bolts 23. This band or clip slidingly embraces the section 18, and it will be noted that the lower end of the band 21 is slightly larger in diameter than the upper portion of the band so that this clip may move easily upon the section 18 either upward or downward.

The bed frame 22 is rectangular and carries one of these clips 21 adjacent each corner of the frame. Any suitable mattress supporting means may be used connected to this frame 22, but as illustrated in Figure 1, a woven wire spring mattress 24 is carried by the frame. The upper bed supporting frame 25 is made exactly like the lower bed supporting frame and is provided with clips 21ª embracing the upper section 15 and slidable thereon. These clips 21ª are of the same form and character as the clips 21.

For the purpose of raising and lowering the lower bed supporting frame 22, I provide the cables or cords 26, the forward ends of which are attached to the lower frame 22, then are trained upward over the pulleys 27, then pass longitudinally beneath the roof of the trailer and are wrapped upon the drums 28. These drums are carried upon a transverse shaft 29 having a cranked portion 30. This shaft 29 is mounted in bearings 31 carried by the wall of the car and the pulleys 27 are also mounted in bearings carried by the wall of the car.

Extending upward from the forward corners of the lower bed frame 22 are the cables or cords 32 which are also connected at their upper ends to the drums 28. Thus it will be seen that as the cranked shaft 29 is manually rotated, it will wind up on these cables or cords and draw the lowermost bed frame upward until it strikes the uppermost frame 25. A continued rotation of the shaft 29 will then draw up both beds to a point adjacent the top of the automobile as shown in dotted lines in Figure 1, where they will be out of the way. The shaft 29 may be held from any reverse rotation by any suitable means but I have shown for this purpose a small length of chain 33 carried by the crank 30 and engageable over a hook 34 extending downward from the top of the trailer. Any other suitable means may be used for this purpose.

It will be seen particularly from Figure 3 that when the shaft 29 is turned in a reverse direction to lower the beds that the top bed will be stopped by the upper end of the section 18 while the lower bed can continue its downward movement until it is stopped by the upper end of the section 13. Both bed frames are, therefore, positively supported when they are in lowered or operative position. Thus there is no cable support for these bed frames when they are lowered into operative position and are sustaining the weight of a person. The cables 26 and 32 are preferably attached to eyes 35 which are formed by the continuation of the clip 21, as shown in Figure 4.

As illustrated, tables 36 are hinged at 37 to the side walls of the trailer and are held in a vertical position by means of latches 38. When the beds are up to the dotted line position in Figure 1, the tables 36 may be turned downward in operative position. The hinges 37 will support the tables in a horizontal position. I have illustrated seats 39 as extending longitudinally of the trailer and being disposed below the level of the lowermost bed frame when it is lowered.

Windows 40 are provided in the side walls of the trailer, there being a pair of these windows above the upper bed when it is lowered and above the lower bed when it is lowered.

While I have illustrated a structure wherein the beds have a width approximately that of the trailer and a length nearly that of the trailer, I do not wish to be limited to this as obviously two sets of relatively narrow beds might be used on each side of the trailer for the passageway between. Each bed, however, will be provided with the four posts and each set of beds will be provided with the lifting and lowering means illustrated.

While I have illustrated certain details of construction and arrangement of parts, I do not wish to be limited thereto except as defined in the appended claim.

What is claimed:—

In a trailer, four posts, each formed of a lower section, an upper section and an intermediate section, the sections being successively less in diameter, the intermediate section having reversely screw threaded engagement with the lower and upper sections, the upper and lower sections carrying at their ends attaching plates, a lower bed supporting frame slidably mounted upon the intermediate sections of the posts and limited in its downward movement by the upper ends of the lower sections, an upper bed supporting frame slidably mounted upon the upper sections and limited in its downward movement by the upper ends of the intermediate sections, and manually operable means for raising the lower section into engagement with the upper section and then raising both sections into the upper portion of the trailer, said means permitting the lowering of both bed frames until the upper bed frame is stopped from further movement and then lowering the lower bed frame until it is stopped from further lowering movement.

ERNEST E. HILLS.